US012771799B2

(12) United States Patent
Takeuchi et al.

(10) Patent No.: US 12,771,799 B2
(45) Date of Patent: Oct. 20, 2026

(54) IMAGE PROCESSING METHOD, IMAGE PROCESSING SYSTEM, AND STORAGE MEDIUM STORING IMAGE PROCESSING PROGRAM FOR A DELAYED FRAME

(71) Applicant: DENSO CORPORATION, Kariya-city (JP)

(72) Inventors: Takashi Takeuchi, Kariya-city (JP); Midori Kato, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 119 days.

(21) Appl. No.: 18/969,888

(22) Filed: Dec. 5, 2024

(65) Prior Publication Data

US 2025/0094108 A1 Mar. 20, 2025

Related U.S. Application Data

(63) Continuation of application No. PCT/JP2023/016579, filed on Apr. 27, 2023.

(30) Foreign Application Priority Data

Jun. 9, 2022 (JP) ................................ 2022-093934
Apr. 24, 2023 (JP) ................................ 2023-071013

(51) Int. Cl.
*H04N 1/32* (2006.01)
*H04N 23/60* (2023.01)

(52) U.S. Cl.
CPC ......... *H04N 1/32101* (2013.01); *H04N 23/60* (2023.01); *H04N 2201/3225* (2013.01)

(58) Field of Classification Search
CPC ................ H04N 1/32101; H04N 1/32; H04N 2201/3201; H04N 2201/3202; H04N 2201/3225; H04N 2201/3226; H04N 23/60
See application file for complete search history.

(56) References Cited

U.S. PATENT DOCUMENTS 7,432,959 B2 * 10/2008 Ueda ...................... H04N 23/64 348/E5.037
2004/0183921 A1 * 9/2004 Ueda ...................... H04N 23/73 348/E5.037

FOREIGN PATENT DOCUMENTS

CN 110855980 A * 2/2020 ............ H04N 17/00
JP 6443145 B 12/2018

* cited by examiner

*Primary Examiner* — Nicholas G Giles
(74) *Attorney, Agent, or Firm* — Precision Patents, P.C.

(57) ABSTRACT

An image processing system is configured to process image frames received from a camera through a network. The image processing system includes a processor. The processor is configured to cause the image processing system to: sequentially obtain the image frames; identify a delayed frame among the image frames that has a delayed frame interval that is greater than a regular frame interval to fall outside a delay acceptable range; add delay information to the delayed frame; and output image data of the image frames including the delayed frame to which the delay information is added.

13 Claims, 6 Drawing Sheets

IMAGE PROCESSING METHOD, IMAGE PROCESSING SYSTEM, AND STORAGE MEDIUM STORING IMAGE PROCESSING PROGRAM FOR A DELAYED FRAME

CROSS REFERENCE TO RELATED APPLICATION

The present application is a continuation application of International Patent Application No. PCT/JP2023/016579 filed on Apr. 27, 2023, which designated the U.S. and claims the benefit of priority from Japanese Patent Application No. 2022-093934 filed on Jun. 9, 2022, and Japanese Patent Application No. 2023-071013 filed on Apr. 24, 2023. The entire disclosures of all of the above applications are incorporated herein by reference.

TECHNICAL FIELD

The present disclosure relates to an image processing technique for processing image frames obtained from a camera through a network.

BACKGROUND

An image processing system is known which processes image data obtained together with the imaging time from a camera.

SUMMARY

According to a first aspect of the present disclosure, an image processing system configured to process image frames obtained from a camera through a network is provided. The image processing system includes a processor. The processor is configured to cause the image processing system to sequentially obtain the image frames and identify a delayed frame among the image frames that has a delayed frame interval greater than a regular frame interval. The delayed frame interval falls outside a delay acceptable range that is predetermined to be greater than the regular frame interval. The processor is further configured to cause the image processing system to add delay information to the delayed frame, and output image data of the image frames including the delayed frame to which the delay information is added.

According to a second aspect of the present disclosure, an image processing method executed by a processor to detect a delay in receiving image frames from a camera through a network is provided. The image processing method includes sequentially obtaining the image frames and identifying a delayed frame among the image frames that has a delayed frame interval greater than a regular frame interval. The delayed frame interval falls outside a delay acceptable range that is predetermined to be greater than the regular frame interval. The method further comprising adding delay information to the delayed frame, and outputting image data of the image frames including the delayed frame to which the delay information is added.

According to a third aspect of the present disclosure, a non-transitory storage medium storing an image processing program is provided. The image processing program includes instructions to detect a delay in receiving image frames from a camera through a network. The instructions, when executed by a processor, cause the processor to sequentially obtain the image frames, and identify a delayed frame among the image frames that has a delayed frame interval greater than a regular frame interval. The delayed frame interval falls outside a delay acceptable range that is predetermined to be greater than the regular frame interval. The instructions are further configured to cause the processor to add delay information to the delayed frame, and output image data of the image frames including the delayed frame to which the delay information is added.

DETAILED DESCRIPTION OF THE PREFERRED EMBODIMENTS

Figure 1:
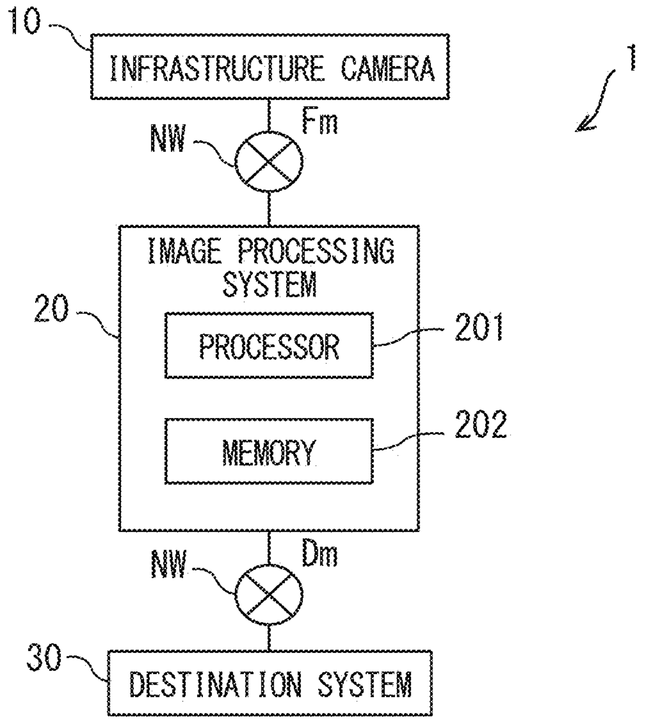
FIG. 1 is a schematic diagram showing the overall configuration of an image distribution system according to a first embodiment.

To begin with, examples of relevant techniques will be described.

An image processing system is known which processes image data obtained together with the imaging time from a camera.

Generally, when obtaining image data from a camera via a network, a delay may occur in a process from a transmission of the image data by the camera to a reception of the image data by the image processing system due to, for example, disturbances in the network. In this regard, if the camera does not have a timestamp function that provides the imaging time with the image data, the image processing system cannot recognize the delay status of the image data, which could decrease the reliability of the system. Conversely, the known image processing system is based on the premise that the system uses a camera with a timestamp function in order to ensure reliability. Thus, the system may lack versatility.

It is an objective of the present disclosure to provide an image processing system that is both versatile and reliable. It is another objective of the present disclosure is to provide an image processing method that is both versatile and reliable. It is another objective of the present disclosure to provide a storage medium storing an image processing program that is both versatile and reliable.

Hereinafter, technical means of the present disclosure for solving the problems will be described.

According to a first aspect of the present disclosure, an image processing system configured to process image frames obtained from a camera through a network is provided. The image processing system includes a processor. The processor is configured to cause the image processing system to sequentially obtain the image frames and identify a delayed frame among the image frames that has a delayed frame interval greater than a regular frame interval. The delayed frame interval falls outside a delay acceptable range that is predetermined to be greater than the regular frame interval. The processor is further configured to cause the image processing system to add delay information to the delayed frame, and output image data of the image frames including the delayed frame to which the delay information is added.

According to a second aspect of the present disclosure, an image processing method executed by a processor to detect a delay in receiving image frames from a camera through a network is provided. The image processing method includes sequentially obtaining the image frames and identifying a delayed frame among the image frames that has a delayed frame interval greater than a regular frame interval. The delayed frame interval falls outside a delay acceptable range that is predetermined to be greater than the regular frame interval. The method further comprising adding delay information to the delayed frame, and outputting image data of the image frames including the delayed frame to which the delay information is added.

According to a third aspect of the present disclosure, a non-transitory storage medium storing an image processing program is provided. The image processing program includes instructions to detect a delay in receiving image frames from a camera through a network. The instructions, when executed by a processor, cause the processor to sequentially obtain the image frames, and identify a delayed frame among the image frames that has a delayed frame interval greater than a regular frame interval. The delayed frame interval falls outside a delay acceptable range that is predetermined to be greater than the regular frame interval. The instructions are further configured to cause the processor to add delay information to the delayed frame, and output image data of the image frames including the delayed frame to which the delay information is added.

According to the first to third aspects, delay information is added to an image frame, as a delayed frame, that has a delayed frame interval that is greater than the regular frame interval. The delayed frame interval falls outside the delay acceptable range. Then, the image data of the image frames including the delayed frame to which the delay information is added is outputted, thereby the system can recognize the delay status of the image frames based on the delay information added to the delayed frame regardless of the specifications of the camera. Therefore, both versatility and reliability are achieved.

The following will describe embodiments of the present disclosure with reference to the drawings. It should be noted that the same reference numerals are assigned to corresponding components in the respective embodiments, and overlapping descriptions may be omitted. When only a part of the configuration is described in the respective embodiments, the configuration of the other embodiments described before may be applied to other parts of the configuration. Further, not only the combinations of the configurations explicitly shown in the description of the respective embodiments, but also the configurations of the plurality of embodiments can be partially combined together when there is no problem in the combination in particular even if the configurations are not explicitly shown.

First Embodiment

Hereinafter, the first embodiment of the present disclosure will be described with reference to the drawings.

As shown in FIG. 1, an image distribution network system 1 according to the first embodiment processes an image frame Fm captured by an infrastructure camera 10, adds information to the image frame Fm to generate image data Dm, and transmits the image data Dm to a destination system 30. The image distribution network system 1 includes an image processing system 20, the destination system 30, and a communication network NW in addition to the infrastructure camera 10. The communication network NW here is an infrastructure network that combines wireless communication and wired communication.

The infrastructure camera 10, which is a fixed or movable camera installed at a fixed point around a target road, captures images of, for example, users and obstacles on the target road. The infrastructure camera 10 transmits image frames Fm, which are images captured in a temporal sequence, to the image processing system 20 via the communication network NW. The infrastructure camera 10 transmits the image frames Fm in a temporal sequence at constant transmission intervals. The infrastructure camera 10 may be multiple infrastructure cameras 10, but the following description will focus on processing performed by a single infrastructure camera 10 for descriptive purpose.

The image processing system 20 is constructed by at least one network server, such as a cloud server or an edge server. The image processing system 20 receives image frames Fm from the infrastructure camera 10 via the communication network NW between the image processing system 20 and the infrastructure camera 10, and processes the obtained image frames Fm by decoding. The image processing system 20 generates image data Dm by processing the image frames Fm and outputs the image data Dm to the destination system 30 via the communication network NW. The image processing system 20 detects a delay in a process from transmission of the image frames Fm by the infrastructure camera 10 to reception of the image frames Fm by the image processing system 20 as a delay in the communication network Nw due to communication congestion, for example. The image processing system 20 adds information indicating delay detection results to the image data Dm and provides the information to the destination system 30.

Here, the destination system 30 is managed by a recipient user of the destination system 30 who requires the image data Dm of the image frames Fm outputted in a temporal sequence from the image processing system 20. The destination system 30 utilizes the image data Dm delivered from the image processing system 20 according to the purpose of each recipient user. The destination system 30 may be constructed by an Electronic Control Unit (ECU) of a vehicle that uses the image data Dm to control the vehicle, which is a user on a road such as an autonomous vehicle. The destination system 30 may be constructed by a network server of a servicer as a user which uses the image data Dm for services such as a traffic service.

The dedicated computer constituting the image processing system 20 that provides information to the destination system 30 has at least one memory 202 and at least one processor 201. The memory 202 is at least one type of non-transitory tangible storage medium, which stores computer readable programs and data in non-transitory manner, such as a semiconductor memory, a magnetic medium, and an optical medium. The processor 201 includes, as a core, at least one of, for example, a central processing unit (CPU), a graphics processing unit (GPU), and a reduced instruction set computer (RISC)-CPU.

The processor 201 executes multiple instructions included in an image processing program stored in the memory 202.

Figure 2:
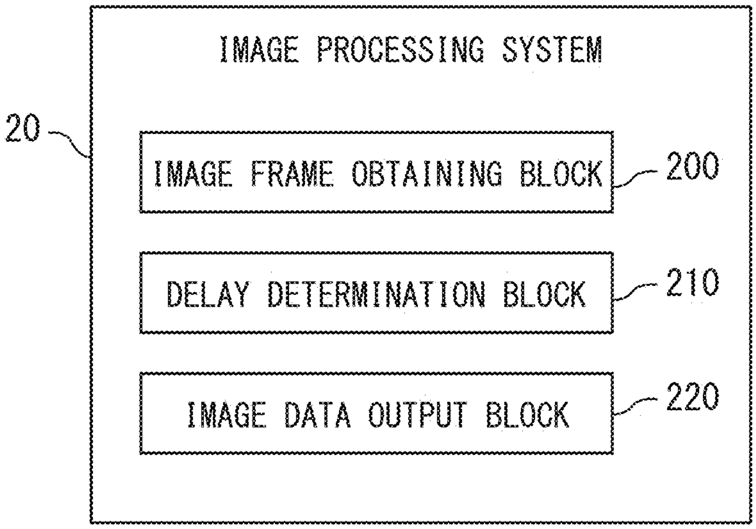
FIG. 2 is a block diagram showing the overall configuration of an image processing system according to the first embodiment.

Thereby, the image processing system 20 constructs functional blocks for processing the image frame Fm. As described above, the image processing system 20 constructs the functional blocks by causing the processor 201 to execute the image processing program stored in the memory 202 to detect a delay in the image frame Fm. As shown in FIG. 2, the functional blocks formed by the image processing system 20 include an image frame obtaining block 200, a delay determination block 210, and an image data output block 220.

The image frame obtaining block 200, the delay determination block 210, and the image data output block 220 cooperatively process image frames Fm to detect delays in the image frames Fm. Hereinafter, a flow of an image processing method (an image processing flow) to detect delays in the image frames Fm will be described with reference to FIG. 3. This flow starts when the image processing system is started and ends when the image processing system is stopped. In this flow, "S" means the processes executed by instructions included in the image processing program.

The delay determination block 210 initializes the remaining delayed frame number range Nd (Nd=0) in S100 of the image processing flow. The remaining delayed frame number range Nd is the number of subsequent delayed frames to which delay information has not been added in S104 yet. The subsequent delayed frames will be described in detail later.

Figure 4:
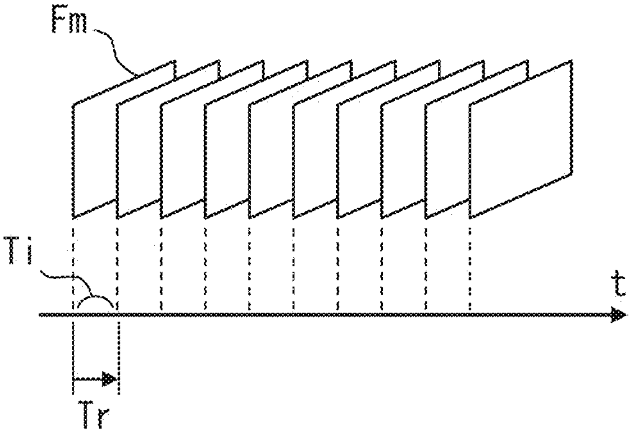
FIG. 4 is a schematic diagram for explaining a normal state.

In S101, the image frame obtaining block 200 receives image frames Fm sequentially transmitted from the infrastructure camera 10 as shown in FIG. 4. Here, the image frame obtaining block 200 periodically obtains image frames Fm at regular frame intervals Ti. The regular frame interval Ti is equal to the constant transmission interval of the infrastructure camera 10.

Figure 5:
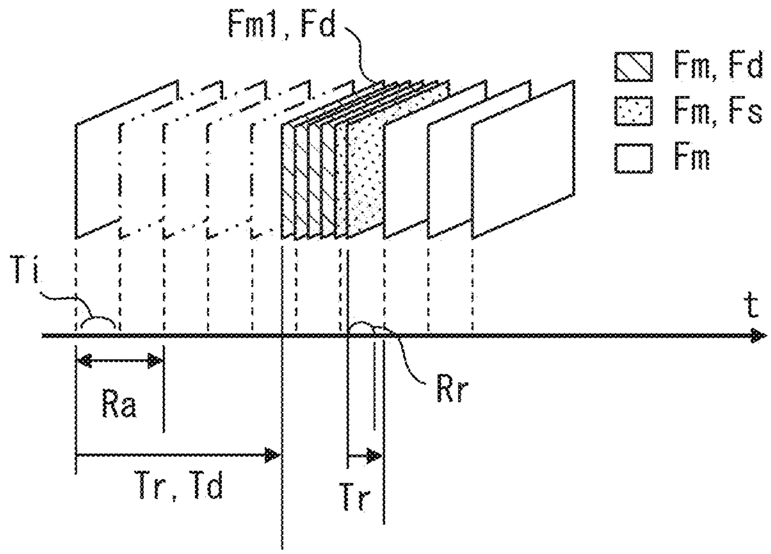
FIG. 5 is a schematic diagram for explaining a delayed frame and a semi-delayed frame.

In S102 shown in FIG. 3, the delay determination block 210 determines whether the interval Tr (hereinafter referred to as a frame interval Tr) at which the image frame obtaining block 200 obtains image frames Fm falls outside a delay acceptable range Ra and whether the remaining delayed frame number range Nd is 1 or more. This determination is made for identifying a delayed frame Fd that is obtained with a delay compared to the image frames Fm obtained at the regular frame intervals Ti, as shown in FIG. 5. The acceptable delay range Ra may be any range that is greater than the regular frame interval Ti. In this embodiment, the acceptable delay range Ra is twice the regular frame interval Ti (i.e., 2Ti). The initial image processing flow after the start of the image processing system 20 does not have a previous image frame Fm that serves as the reference for the frame interval Tr. Therefore, in S102 in the first cycle, the delay determination block 210 determines that the frame interval Tr falls within the delay acceptable range Ra.

Figure 3:
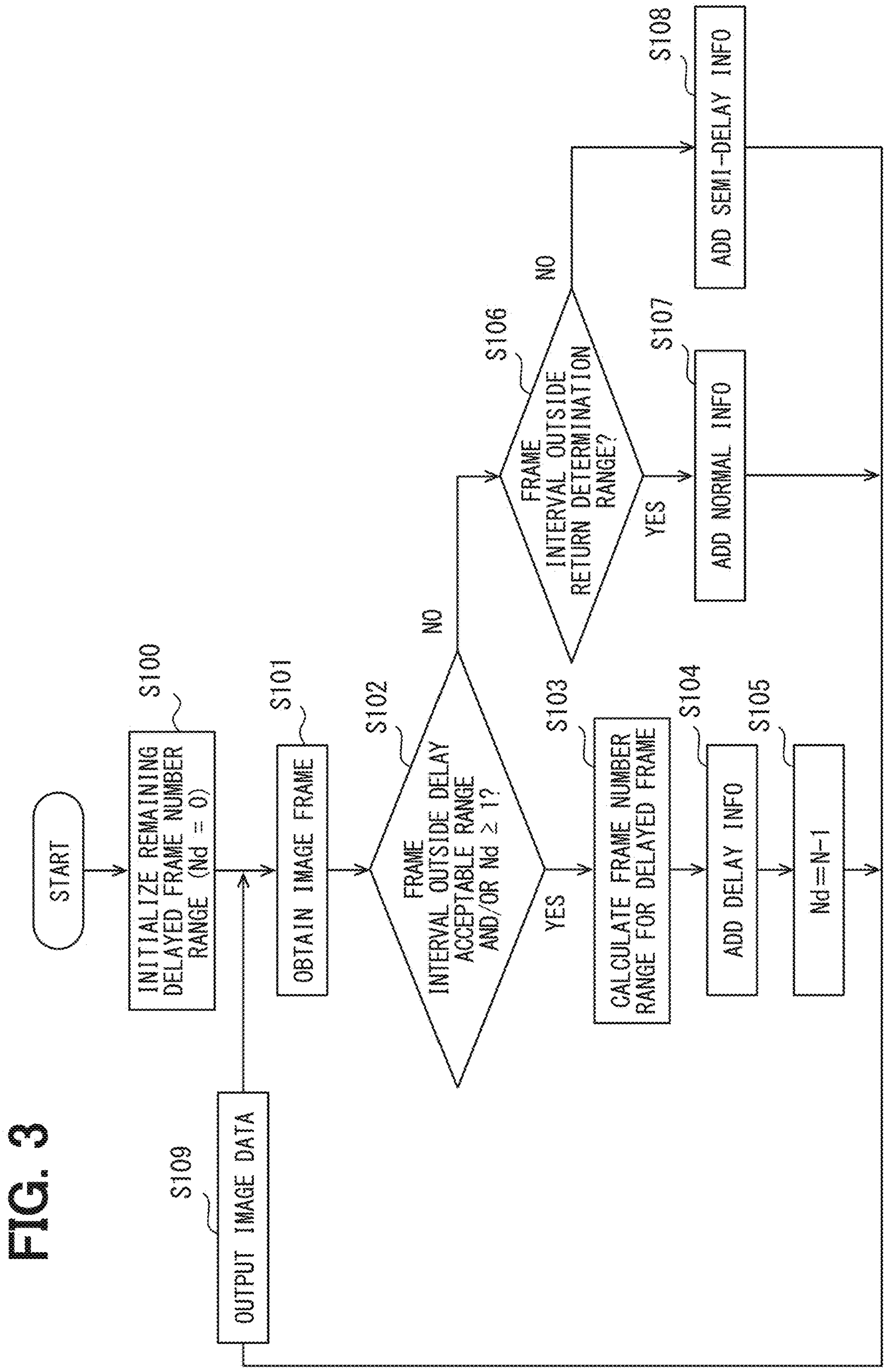
FIG. 3 is a flow chart showing an image processing method according to the first embodiment.

In S102 shown in FIG. 3, when the delay determination block 210 determines that the frame interval Tr of the image frame Fm falls outside the delay acceptable range Ra (see FIG. 5) and/or the remaining delayed frame number range Nd is 1 or more, the delay determination block 210 in S103 identifies, as a delayed frame Fd, a frame that has a frame interval (i.e., a delayed frame interval) that falls outside the delay acceptable range. The delay determination block 210 further configured to obtain, as a delayed frame number range, a number based on a ratio (Td/Ti) of the delayed frame interval Td to the regular frame interval, and identify, as a subsequent delayed frame, at least one frame that is subsequently obtained after the delayed frame within the delayed frame number range. The delayed frame number range N is calculated based on a ratio (Td/Ti) of the delayed frame interval that is the frame interval outside the delay acceptable range Ra to the regular frame interval Ti. Specifically, the delay determination block 210 calculates the delayed frame number range N for the delayed frame Fd based on the ratio Td/Ti with the following Equation 1.

$$N = Nd + (Td/Ti) \quad \text{(Equation 1)}$$

The principle of identifying the delayed frame Fd and the subsequent delayed frames by calculating the delayed frame number range N using Equation 1 in S103 will be described in detail with reference to FIG. 5. In FIG. 5, the obtaining timings of the image frames Fm at the regular frame intervals Ti are indicated by two-dot chain lines. In the example of FIG. 5, the frame interval Tr of the image frame Fm1 is greater than 4Ti and less than 5Ti. That is, the image frame Fm1 has a frame interval that falls outside the delay acceptable range (2Ti), and thus the image frame Fm1 is identified as the delayed frame having a delayed frame interval between 4Ti and 5Ti. In this case, due to the delay of the image frame Fm1, the three image frames Fm subsequently obtained after the delayed frame Fm1 are also obtained at delayed timings compared to the expected obtaining timings based on the regular frame interval Ti. Therefore, the delay determination block 210 identifies, as the subsequent delayed frames, the three image frames Fm subsequently obtained after the delayed frame Fm1 based on the delay frame interval Td of the delayed frame Fd (i.e., the image frame Fm1).

As shown in FIG. 3, in S104 after S103, the delay determination block 210 adds delay information Id, such as a flag, indicating the delay state of communication to the delayed frame Fd or the subsequent delayed frames.

In S105 following S104, the delay determination block 210 sets the remaining delayed frame number range Nd to N−1 (Nd=N−1). After execution of S105, the image processing flow proceeds to S109.

If the delay determination block 210 determines that the frame interval Tr of the image frame Fm falls within the delay acceptable range Ra and that the remaining delayed frame number range Nd is less than 1, the image processing flow proceeds to S106. In S106, the delay determination block 210 determines whether the frame interval Tr of the image frame Fm has increased to a value outside a return determination range Rr from a value within the return determination range Rr. Here, the return determination range Rr may be any range that is less than the regular frame interval Ti. In this embodiment, the return determination range Rr is one second of the regular frame interval Ti (i.e., Ti/2).

When the delay determination block 210 determines in S106 that the frame interval Tr has increased to a value outside the return determination range Rr, the image processing flow proceeds to S107. In this case, the image frame Fm is a normal frame whose frame interval Tr falls within the delay acceptable range Ra and outside the return determination range Rr. In S107, the delay determination block 210 adds normal information In, such as a flag, which indicates a normal state without delay, to the normal image frame Fm. When the frame interval Tr of the image frame Fm has increased to a value that is outside the return determination range Rr and within the delay acceptable range Ra from a value that is within the return determination range Rr, the delay determination block 210 stops identifying a frame as a semi-delayed frame Fs, which will be described later. After execution of S107, the image processing flow proceeds to S109.

Even when the delay determination block 210 determines in S106 that the frame interval Tr is still within the return determination range Rr, the currently obtained image frame Fm is not a delayed frame Fd. However, the currently obtained image frame Fm is obtained later than the expected obtaining timing as shown in FIG. 5, thus the image frame Fm is identified as a semi-delayed frame Fs. The delay determination block 210 identifies, as the semi-delayed frame Fs, at least one subsequent frame that is subsequently obtained after the subsequent delayed frame, which is identified according to the delayed frame number range N based on the ratio Td/Ti, and that has a frame interval Tr within the return determination range Rr, which is within the delay acceptable range Ra. When the delay determination block 210 determines that the frame interval Tr falls within the return determination range Rr, the image processing flow proceeds to S108. In S108, the delay determination block 210 adds semi-delay information Is, such as a flag, which indicates a semi-delay state of the communication that is different from the delay information Id, to the semi-delayed frame Fs. After execution of S108, the image processing flow proceeds to S109.

In S109, the image data output block 220 outputs, to the destination system 30, the image data Dm of the image frames Fm in a temporal sequence including the image frames Fm to which the delay information Id, normal information In, or semi-delay information Is has been added. The image data Dm outputted at this time may be the image frame Fm itself to which any one of the delay information Id, the normal information In, and the semi-delay information Is has been added. The image data Dm outputted at this time may be the image frame Fm to which other information, such as recognition information obtained by a recognition process, has been added by the image data output block 220 in addition to any of the delay information Id, the normal information In, or the semi-delay information Is. After execution of S109, the image processing flow returns to S101.

By repeating steps S101 to S109 of the image processing flow described above, image data Dm that is obtained by processing the image frames Fm received in a temporal sequence from the infrastructure camera 10 is transmitted in that temporal sequence.

(Actions and Effects)

The actions and effects of the first embodiment described above are described below.

In the first embodiment, the delay information Id is added to a delayed frame Fd that is obtained with a delay compared to an image frame Fm obtained at regular frame intervals Ti. The delayed frame Fd is an image frame Fm having a frame interval Tr that is greater than the acceptable delay range Ra. Then, the image processing system 20 outputs the image data Dm of the image frames Fm in the temporal sequence including the delayed frame Fd to which the delay information Id is added. Thus, the delay status of the image frames Fm can be recognized based on the delay information Id that is added to the delayed frame Fd regardless of the specifications of the infrastructure camera 10. Therefore, both versatility and reliability are achieved.

In the first embodiment, the subsequent delayed frames Fd are identified based on the frame number range N that is calculated from a ratio of the regular frame interval Ti, which is constant, to the delayed frame interval Td, which is the frame interval Tr outside the delay acceptable range Ra. The delayed frame number range N indicates the number of the image frames that are supposed to be obtained in the delayed frame interval. Thus, according to this, the delay information Id can be added to all of the image frames Fm supposed to be obtained in the delayed frame interval Td within the delayed frame number range N, as the delayed frame Fd or the subsequent delayed frames. Therefore, the reliability can be improved by determining the number of the delayed frame Fd and the subsequent delayed frames as described above with keeping the versatility.

In the first embodiment, the image processing system 20 identifies, as the semi-delayed frame, the image frame Fm that is obtained after the delayed frame or the subsequent delayed frame, which is identified based on the ratio of the regular frame interval Ti to the delayed frame interval Td, and has a frame interval Tr that are still within the return determination range Ra, which is within the delay acceptable range Ra. Then, the semi-delay information Is, which is different from the delay information Id, is added to the semi-delayed frame Fs. That is, the semi-delayed frame Fs that is secondarily delayed due to the influence of the delayed frame Fd is identified, and the semi-delay information Is is added to the semi-delayed frame Fs. Thus, the reliability can be further improved by considering the secondary delays as described above with keeping the versatility.

In the first embodiment, the image processing system 20 does not identify, as the semi-delayed frame, a frame that is subsequently obtained after the identified semi-delayed frame if the frame has a frame interval Tr that exceeds the return determination range Rr within the delay acceptable range Ra. In other words, the image processing system 20 identifies a frame as the delayed frame, the subsequent delayed frame, or the semi-delayed frame until the delay in obtaining the image frames Fm is eliminated. Thus, the delay information Id or the semi-delay information Is is correctly added only to a frame that is affected by the delay. Therefore, both reliability and versatility are improved.

The return determination range Rr in the first embodiment is less than the regular frame interval Ti. This makes it possible to accurately identify the semi-delayed frame Fs that is secondarily delayed due to the influence of the delayed frame Fd, and to add the semi-delay information Is to the semi-delayed frame Fs. Therefore, high reliability can be ensured by considering secondary delays.

The image processing system 20 of the first embodiment distributes, to the destination user, the image data Dm of the image frames Fm in a temporal sequence including the delayed frame Fd and the subsequent delay frames to which delay information Id has been added. This allows the destination user to use the image data Dm while recognizing the delay status of the image frames Fm based on the delay information Id of the delayed frame Fd and the subsequent delayed frames. Therefore, both versatility and reliability can be achieved for the destination use.

Second Embodiment

A second embodiment is a modification to the first embodiment.

Figure 6:
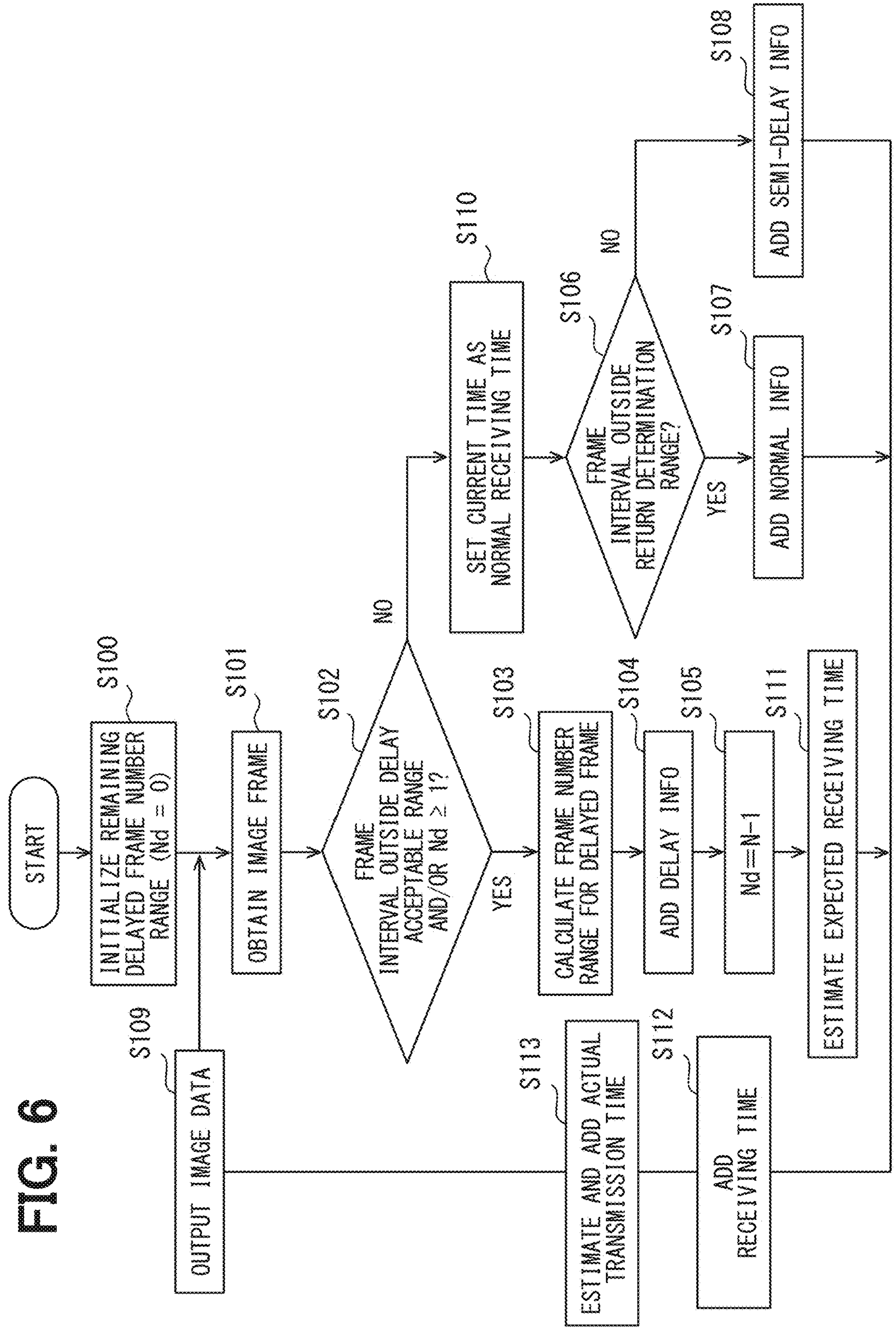
FIG. 6 is a flow chart showing an image processing method according to the second embodiment.

In the image processing flow according to the second embodiment, as shown in FIG. 6, processing from S100 through S105 similar to those in the first embodiment are executed. In S102 of the image processing flow according to the second embodiment, when it is determined that the frame interval Tr of the image frame falls within the delay acceptable range Ra and the remaining delayed frame number range Nd is less than 1, the image processing flow proceeds to S110. In S110, the delay determination block 210 sets the current time as a normal receiving time of the image frame Fm. After execution of S110, the image processing flow proceeds to S106. The processing from S106 through S108 is similar to that in the first embodiment.

In S111 after S105, the delay determination block 210 estimates an expected receiving time as a time correlated with the regular frame interval Ti and the delayed frame number range N. Specifically, the delay determination block 210 estimates the expected receiving time of the image frame Fm by multiplying the regular frame interval Ti by the frame number range N to get a calculated value (i.e., Ti×N) and adding the calculated value to the receiving time of the image frame Fm previously obtained before the delayed frame.

After execution of S111, the image processing flow proceeds to S112. After execution of S107, the image processing flow also proceeds to S112. Furthermore, after execution of S108, the image processing flow proceeds to S112. In S112, the delay determination block 210 adds the receiving time to the image frame Fm.

In S113 after S112, the delay determination block 210 estimates an actual transmission time of the image frame Fm from the infrastructure camera 10. Specifically, the delay determination block 210 estimates the actual transmission time of the image frame Fm by subtracting a constant delay time Trd from the normal or expected receiving time. Here, the constant delay time Trd is defined as the time that constantly occurs in a process from transmission of an image frame Fm by the infrastructure camera 10 and reception of the image frame Fm by the image processing system 20 in a normal state without influence, such as external disturbance, in the communication network NW. Furthermore, in S113, the delay determination block 210 adds the actual transmission time estimated as described above to the image frame Fm. The processing of S109 after S113 is similar to that in the first embodiment.

According to the image processing flow described above, the image processing system 20 adds the normal or expected receiving time to the image frame Fm in addition to the delay information Id, the semi-delay information Is, or the normal information In. The image processing system 20 adds the actual transmission time of the delayed frame Fd, which is calculated by subtracting the constant delay time Trd from the normal or expected receiving time in addition to the delay information Id, the semi-delay information Is, or the normal information.

(Effects)

The effects of the second embodiment described above will be described below.

In the second embodiment, the expected receiving time, which correlates with the regular frame interval Ti and the delayed frame number range N for the delayed frame Fd, is added to the delayed frame Fd together with the delay information Id. According to this, the delay of the delayed frame Fd can be accurately recognized based on not only the delay information Id but also the expected receiving time To by the image processing system 20. Therefore, both reliability and versatility are improved.

In the second embodiment of the image processing system 20, the actual transmission time of the delayed frame Fd is added to the delayed frame Fd together with the delay information Id or the expected receiving time. The actual transmission time of the delayed frame Fd is calculated by subtracting the constant delay time Trd, which occurs from the transmission of the image frame Fm by the infrastructure camera 10 to the reception of the image frame Fm by the image processing system 20, from the expected receiving time. This makes it possible to accurately recognize the delay of the delayed frame Fd based not only on the delay information Id but also on the expected receiving time by the image processing system 20 and the actual transmission time from the infrastructure camera 10. Therefore, it is possible to ensure particularly high reliability.

Third Embodiment

A third embodiment is a modification to the first embodiment.

Figure 7:
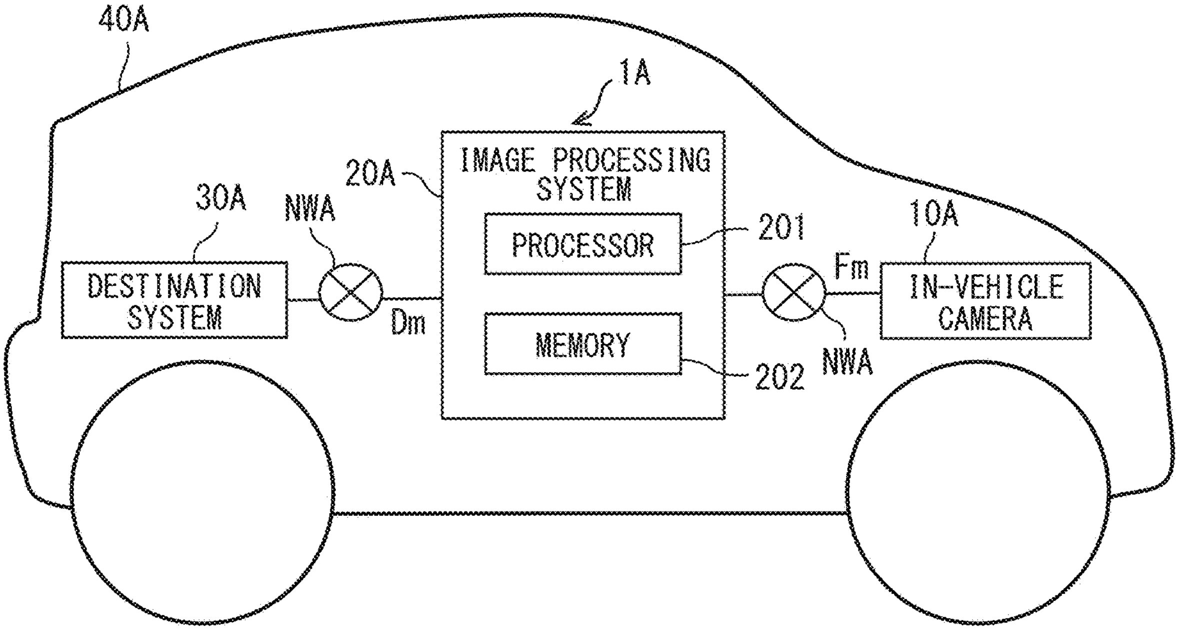
FIG. 7 is a schematic diagram showing the overall configuration of an image distribution system according to the third embodiment.
Figure 8:
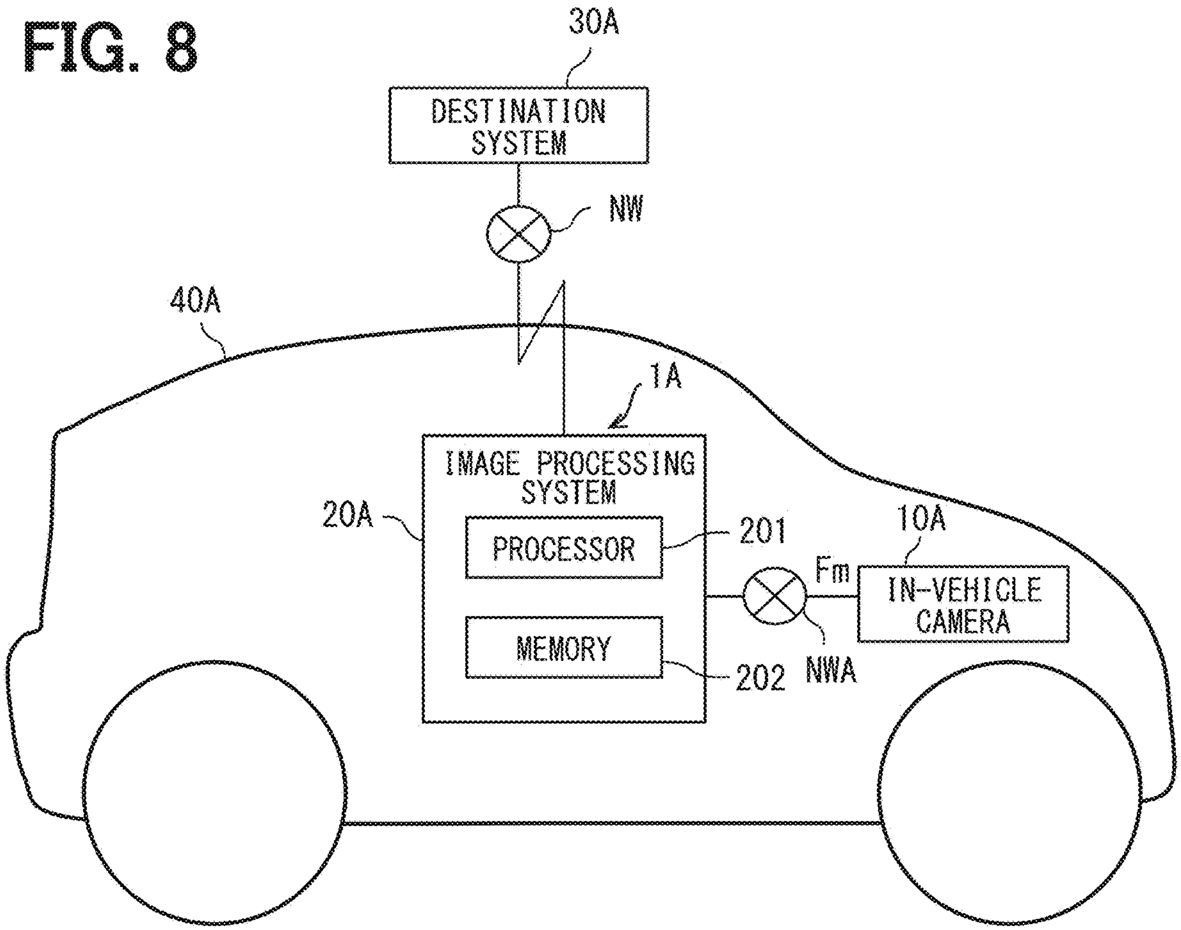
FIG. 8 is a schematic diagram showing another overall configuration of the image distribution system according to the third embodiment.
Figure 9:
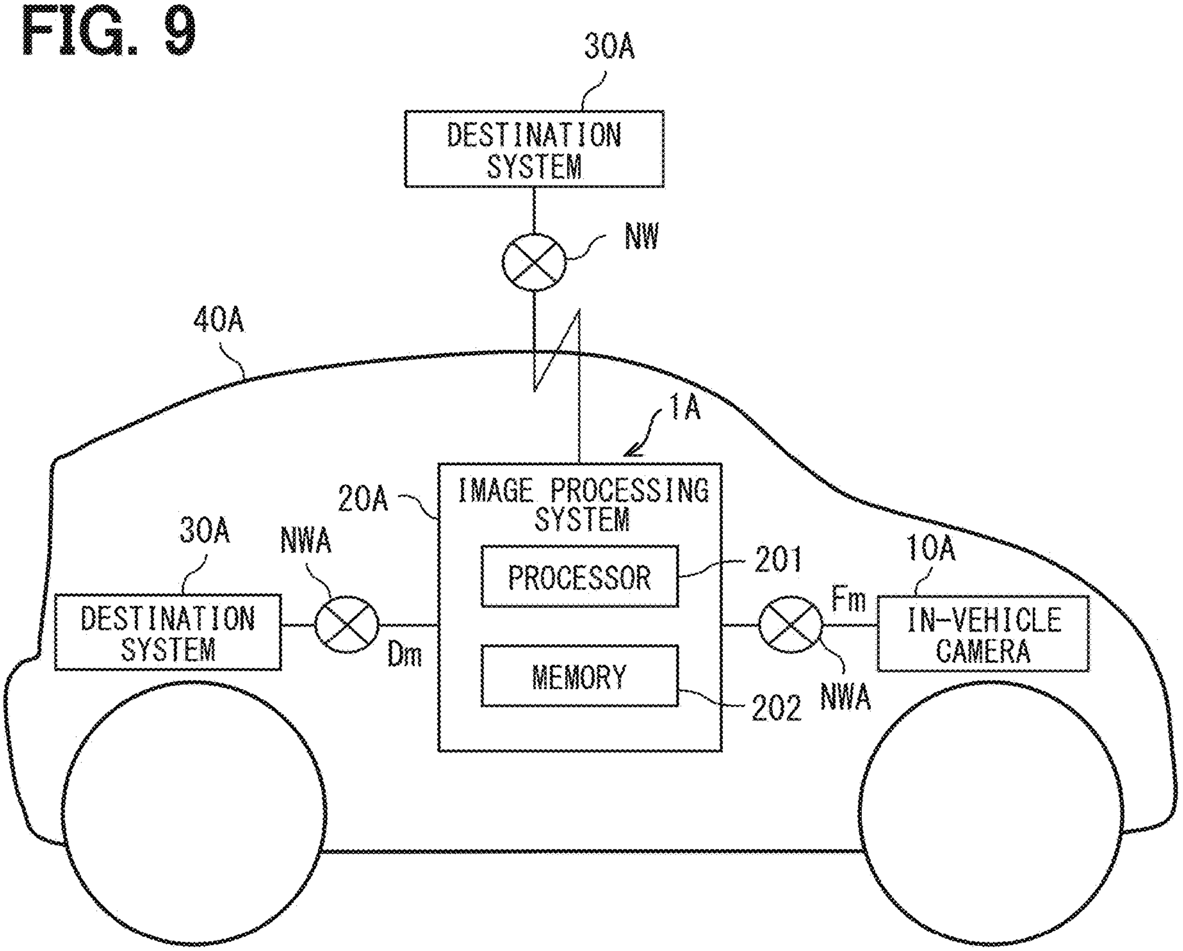
FIG. 9 is a schematic diagram showing another overall configuration of the image distribution system according to the third embodiment.

As shown in FIGS. 7 to 9, an image transmission network system 1A according to the third embodiment processes an image frame Fm captured by an in-vehicle camera 10A, adds information to the image data Dm, and transmits the image data Dm to a destination system 30A. For this purpose, the image transmission network system 1A includes the in-vehicle camera 10A, an image processing system 20A, the destination system 30A, and an in-vehicle network NWA and/or a communication network NW. Here, the in-vehicle network NWA is, for example, a Local Area Network (LAN) constructed in the host vehicle 40A, and is connected to multiple electronic devices, such as sensors and/or actuators, other than the in-vehicle camera 10A in the host vehicle 40A.

The in-vehicle camera 10A and the image processing system 20A in the image transmission network system 1A are installed in the host vehicle 40A and connected to each other through the in-vehicle network NWA. As shown in FIGS. 7 and 9, the destination system 30A in the image transmission network system 1A may be mounted in the host vehicle 40A and connected to the image processing system 20A via the in-vehicle network NWA. As shown in FIGS. 8 and 9, the destination system 30A of the image transmission network system 1A may be mounted on another vehicle outside the host vehicle 40A, or constructed by a network server outside the host vehicle 40A, and connected to the image processing system 20A via a communication network NW.

As shown in FIGS. 7 to 9, the in-vehicle camera 10A of the third embodiment corresponding to the infrastructure camera 10 of the first embodiment is a fixed or movable camera with respect to the host vehicle 40A. The in-vehicle camera 10A captures images of, for example, users and obstacles on a road outside the host vehicle 40A. The in-vehicle camera 10A transmits image frames Fm, which are sequentially captured, to the image processing system 20A via the in-vehicle network NWA. At this time, the in-vehicle camera 10A transmits the image frames Fm in a temporal sequence at constant transmission intervals. The in-vehicle camera 10A may be a single camera or multiple cameras, but the following description will focus on the processing using the single in-vehicle camera 10A for descriptive purpose.

An image processing system 20A of the third embodiment, which corresponds to the image processing system 20 of the first embodiment, is constructed by an ECU that processes image data Dm by controlling the in-vehicle camera 10A in the host vehicle 40A, such as an autonomous vehicle. The image processing system 20A receives image frames Fm from the in-vehicle camera 10A via the in-vehicle network NWA to which the in-vehicle camera 10A is connected and processes the obtained image frames Fm by decoding. The image processing system 20A outputs the image data Dm obtained by processing the image frames Fm to the destination system 30A via the in-vehicle network NWA and/or the communication network NW. The image processing system 20A detects the delay from the transmission of an image frame Fm by the in-vehicle camera 10A to the reception of the image frame Fm by the image processing system 20A as a delay that occurs in the in-vehicle network NWA due to, for example, communication congestion. The image processing system 20A adds information indicating delay detection results to the image data Dm and transmits the image data to the destination system 30A.

The destination system 30A of the third embodiment corresponding to the destination system 30 of the first embodiment is managed by a recipient user of the destination system 30 who requires the image data Dm of the image frames Fm sequentially outputted from the image processing system 20A. The destination system 30A utilizes the image data Dm transmitted from the image processing system 20A according to the purpose of each recipient user. The destination system 30A may be constructed by an ECU that uses the image data Dm to control the host vehicle 40A or another vehicle, which is a user on a road such as an autonomous vehicle. The destination system 30A may be constructed by a network server of a servicer as a user that uses the image data Dm for services such as a traffic service.

The dedicated computer constituting the image processing system 20A that provides information to the destination system 30A has at least one memory 202 and at least one processor 201, similarly to the first embodiment. The multiple functional blocks constructed by the image processing system 20A include the image frame obtaining block 200, the delay determination block 210, and the image data output block 220, similarly to the first embodiment shown in FIG. 2. These functional blocks 200, 210, and 220 jointly performs the image processing flow of the third embodiment. Thereby, the processing is executed in which the infrastructure camera 10, the image processing system 20, and the distribution destination system 30 in the flow described in the first embodiment are respectively read as the in-vehicle camera 10A, the image processing system 20A, and the destination system 30A.

According to the third embodiment, similar effects as those of the first embodiment can be achieved. Here, in the third embodiment, the image data Dm of the image frames Fm including the delayed frame Fd to which the delay information Id is added is outputted. Thus, the delay status of the image frame Fm can be recognized regardless of the specifications of the in-vehicle camera 10A, thereby achieving both versatility and reliability.

OTHER EMBODIMENTS

Although embodiments have been described above, the present disclosure is not to be construed as being limited to these embodiments, and can be applied to various embodiments and combinations within a scope not deviating from the gist of the present disclosure.

In the modified example, processing from S111 through S113 may be omitted in the image processing flow described in the second embodiment, and the receiving time may not be added to the image frame Fm. In a modification, the second embodiment may be applied to the third embodiment. However, the constant delay time Trd in the image processing flow of the second embodiment applied to the third embodiment should be defined as the time that constantly occurs from the transmission of the image frame Fm by the in-vehicle camera 10A to the reception of the image frame Fm by the image processing system 20A in a normal state without influence, such as external disturbance, in the in-vehicle network NWA.

The invention claimed is:

1. An image processing system configured to process image frames obtained from a camera through a network, the image processing system comprising a processor configured to cause the image processing system to:
sequentially obtain the image frames;
identify a delayed frame among the image frames that has a delayed frame interval greater than a regular frame interval, the delayed frame interval falling outside a delay acceptable range that is predetermined to be greater than the regular frame interval;
add delay information to the delayed frame; and
output image data of the image frames including the delayed frame to which the delay information is added.

2. The image processing system according to claim 1, wherein the processor is further configured to cause the image processing system to:
obtain, as a determined frame number range, a number based on a ratio of the delayed frame interval to the regular frame interval having a constant value; and
identify, as a subsequent delayed frame, at least one frame that is subsequently obtained after the delayed frame within the determined frame number range.

3. The image processing system according to claim 2, wherein a range that is smaller than the delay acceptable range is defined as a return determination range,
the processor is further configured to cause the image processing system to:
identify, as a semi-delayed frame, at least one subsequent frame that is subsequently obtained after the at least one identified subsequent delayed frame and that has a frame interval within the return determination range;
add semi-delay information that is different from the delay information to the semi-delayed frame; and
output the image data including the semi-delayed frame to which the semi-delay information is added.

4. The image processing system according to claim 3, wherein the processor is further configured to cause the image processing system not to identify, as the semi-delayed frame, a frame that is subsequently obtained after the at least one identified semi-delayed frame if the frame has a frame interval that exceeds the return determination range.

5. The image processing system according to claim 3, wherein the return determination range is less than the regular frame interval.

6. The image processing system according to claim 2, wherein the processor is further configured to cause the image processing system to add, to the delayed frame, an expected receiving time that is correlated to the regular frame interval and the determined frame number range.

7. The image processing system according to claim 6, wherein the image processing system receives each of the image frames from the camera with a constant delay time, an actual transmission time at which the camera transmits the delayed frame is calculated by subtracting the constant delay time from the expected receiving time, and the processor is further configured to cause the image processing system to add the actual transmission time to the delayed frame in addition to the delay information and the expected receiving time.

8. The image processing system according to claim 2, wherein the image processing system receives each of the image frames from the camera with a constant delay time, an actual transmission time at which the camera transmits the delayed frame is calculated by subtracting the constant delay time from an expected receiving time of the delayed frame that is correlated to the regular frame interval and the determined frame number range, and the processor is further configured to cause the image processing system to add the actual transmission time to the delayed frame in addition to the delay information.

9. The image processing system according to claim 1, wherein the processor is configured to cause the image processing system to distribute or transmit the image data to a destination user to output the image data.

10. The image processing system according to claim 1, wherein the camera is an infrastructure camera, and the network is an infrastructure network.

11. The image processing system according to claim 1, wherein the camera is an in-vehicle camera, and the network is an in-vehicle network.

12. An image processing method executed by a processor to detect a delay in receiving image frames from a camera through a network, the image processing method comprising:

sequentially obtaining the image frames;

identifying a delayed frame among the image frames that has a delayed frame interval greater than a regular frame interval, the delayed frame interval falling outside a delay acceptable range that is predetermined to be greater than the regular frame interval;

adding delay information to the delayed frame; and outputting image data of the image frames including the delayed frame to which the delay information is added.

13. A non-transitory storage medium storing an image processing program comprising instructions to detect a delay in receiving image frames from a camera through a network, the instructions, when executed by a processor, causing the processor to:

sequentially obtain the image frames;

identify a delayed frame among the image frames that has a delayed frame interval greater than a regular frame interval, the delayed frame interval falling outside a delay acceptable range that is predetermined to be greater than the regular frame interval;

add delay information to the delayed frame; and output image data of the image frames including the delayed frame to which the delay information is added.

* * * * *